United States Patent
Fix et al.

(10) Patent No.: US 10,091,610 B2
(45) Date of Patent: *Oct. 2, 2018

(54) FACILITATION OF DETERMINATION OF ANTENNA LOCATION

(71) Applicant: AT&T Mobility II LLC, Atlanta, GA (US)

(72) Inventors: Jeremy Fix, Acworth, GA (US); Andrew G. Hume, Mission Viejo, CA (US); Sheldon Kent Meredith, Marietta, GA (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/336,459

(22) Filed: Oct. 27, 2016

(65) Prior Publication Data

US 2017/0048663 A1  Feb. 16, 2017

Related U.S. Application Data

(63) Continuation of application No. 14/276,747, filed on May 13, 2014, now Pat. No. 9,507,009, which is a (Continued)

(51) Int. Cl.
| | |
|---|---|
| *H04W 4/02* | (2018.01) |
| *H04W 24/08* | (2009.01) |
| *H04W 24/10* | (2009.01) |
| *H04W 64/00* | (2009.01) |
| *G01S 5/02* | (2010.01) |

(52) U.S. Cl.
CPC ............. *H04W 4/02* (2013.01); *G01S 5/0242* (2013.01); *G01S 5/0257* (2013.01); (Continued)

(58) Field of Classification Search
CPC ..... H04W 24/02; H04W 24/06; H04W 24/08; H04W 24/10; H04W 64/003
(Continued)

(56) References Cited

U.S. PATENT DOCUMENTS

| | | |
|---|---|---|
| 6,670,906 B1 | 12/2003 | Roberts et al. |
| 7,218,275 B2 | 5/2007 | Han |

(Continued)

OTHER PUBLICATIONS

Office Action dated Nov. 19, 2013 for U.S. Appl. No. 13/483,283, 17 Pages.

(Continued)

*Primary Examiner* — Jean Gelin

(74) *Attorney, Agent, or Firm* — Amin, Turocy & Watson, LLP

(57) ABSTRACT

Assisted global positioning system (AGPS) information is retrieved from mobile devices and employed to facilitate antenna location. Measurement information, including AGPS information, can be received from a plurality of mobile devices dispersed over a geographical region. The measurement information can include location and timing information for the plurality of mobile devices. A timing difference between co-located antennas of a base station associated with the plurality of mobile devices can be computed. The location of the co-located antennas can be determined based on evaluating errors resultant from estimations based on a plurality of test locations. The measurement information can be aggregated over time and can be employed to update the antenna locations.

20 Claims, 10 Drawing Sheets

Related U.S. Application Data continuation of application No. 13/483,283, filed on May 30, 2012, now Pat. No. 8,761,781.

(52) U.S. Cl.
CPC ............ *G01S 5/0263* (2013.01); *H04W 24/08* (2013.01); *H04W 24/10* (2013.01); *H04W 64/003* (2013.01)

(58) Field of Classification Search
USPC ........ 455/63.4, 67.11, 25, 562.1, 448, 226.1, 455/226.2, 226.3, 226.4, 561, 575.7
See application file for complete search history.

(56) References Cited

U.S. PATENT DOCUMENTS

| | | | |
|---|---|---|---|
| 7,262,731 B2 | 8/2007 | Han | |
| 7,286,085 B2 | 10/2007 | Kolanek et al. | |
| 8,447,328 B2 * | 5/2013 | Austin | G01S 5/0063 455/404.2 |
| 2004/0008646 A1 * | 1/2004 | Park | H04B 7/2643 370/331 |
| 2005/0064844 A1 | 3/2005 | McAvoy et al. | |
| 2006/0114157 A1 | 6/2006 | Kolanek et al. | |
| 2009/0131075 A1 * | 5/2009 | Mazlum | G01S 5/0205 455/456.1 |
| 2009/0171583 A1 | 7/2009 | DiEsposti | |
| 2009/0186658 A1 | 7/2009 | Jiang et al. | |
| 2012/0052883 A1 | 3/2012 | Austin et al. | |

OTHER PUBLICATIONS

Office Action dated May 8, 2015 for U.S. Appl. No. 14/276,747, 17 Pages.
Office Action dated Jan. 11, 2016 for U.S. Appl. No. 14/276,747, 14 Pages.

* cited by examiner

FACILITATION OF DETERMINATION OF ANTENNA LOCATION

CROSS-REFERENCE TO RELATED APPLICATIONS

This patent application is a continuation of, and claims priority to each of, U.S. patent application Ser. No. 14/276,747, filed May 13, 2014, and entitled "FACILITATION OF DETERMINATION OF ANTENNA LOCATION," which is a continuation of U.S. patent application Ser. No. 13/483,283 (now U.S. Pat. No. 8,761,781), filed May 30, 2012, and entitled "FACILITATION OF DETERMINATION OF ANTENNA LOCATION," the respective entireties of which applications are hereby incorporated by reference herein.

TECHNICAL FIELD

The subject disclosure relates to wireless communications and, more particularly, to various embodiments that facilitate determination of antenna location within wireless communications networks.

BACKGROUND

Accurate antenna location information can enable a wireless communications system to provide locating systems and location-based services that rely on antenna location information. For example, location-based services that aide parents in locating children via handset location can be provided. Further, accurate antenna location information can also benefit network modeling tools that rely on antenna location information to accurately model signal coverage. As antenna locations change on a tower or rooftop, antenna location information can be determined and employed to adjust network modeling tools for improved consistent accuracy.

SUMMARY

The following presents a simplified summary of one or more of the embodiments in order to provide a basic understanding of some embodiments of the embodiments. This summary is not an extensive overview of the embodiments described herein. It is intended to neither identify key or critical elements of the embodiments nor delineate any scope particular embodiments of the embodiments or any scope of the claims. Its sole purpose is to present some concepts of the embodiments in a simplified form as a prelude to the more detailed description that is presented later. It will also be appreciated that the detailed description may include additional or alternative embodiments beyond those described in this summary.

In one embodiment, a method can include: collecting, by a system including at least one processor, measurement information from a plurality of mobile devices dispersed over a geographical region, wherein the measurement information includes location and timing information for the plurality of mobile devices; computing, by the system, a timing difference between co-located antennas of a base station associated with the plurality of mobile devices; and determining, by the system, a location of a first one of the co-located antennas and a location of a second one of the co-located antennas, based, at least, on a plurality of test locations of the second one of the co-located antennas and errors associated with the plurality of test locations.

In one embodiment, a non-transitory computer-readable storage medium can include computer-executable instructions that, in response to execution, cause a system including a processor to perform operations. The operations can include: receiving measurement information from a plurality of mobile devices, wherein the measurement information comprises assisted global positioning system information; and determining at least one estimated base station antenna location based, at least, on the measurement information.

In one embodiment, a system can include: a memory that stores computer-executable instructions; and a processor, communicatively coupled to the memory, that facilitates execution of computer-executable instructions to at least: determine information from a plurality of mobile devices; and select ones of the plurality of mobile devices to query for assisted global positioning system information based, at least, on a set of criteria, wherein the set of criteria comprise a first criterion based on whether the plurality of mobile devices have a historical active call duration within a predetermined range of time, and a second criterion based on whether the plurality of mobile devices are configured with assisted global positioning system capability.

The following description and the annexed drawings set forth certain illustrative embodiments of the embodiments. These embodiments are indicative, however, of but a few of the various ways in which the principles of the embodiments can be employed. Other features of the embodiments will become apparent from the following detailed description of the embodiments when considered in conjunction with the drawings.

DETAILED DESCRIPTION

Figure 1:
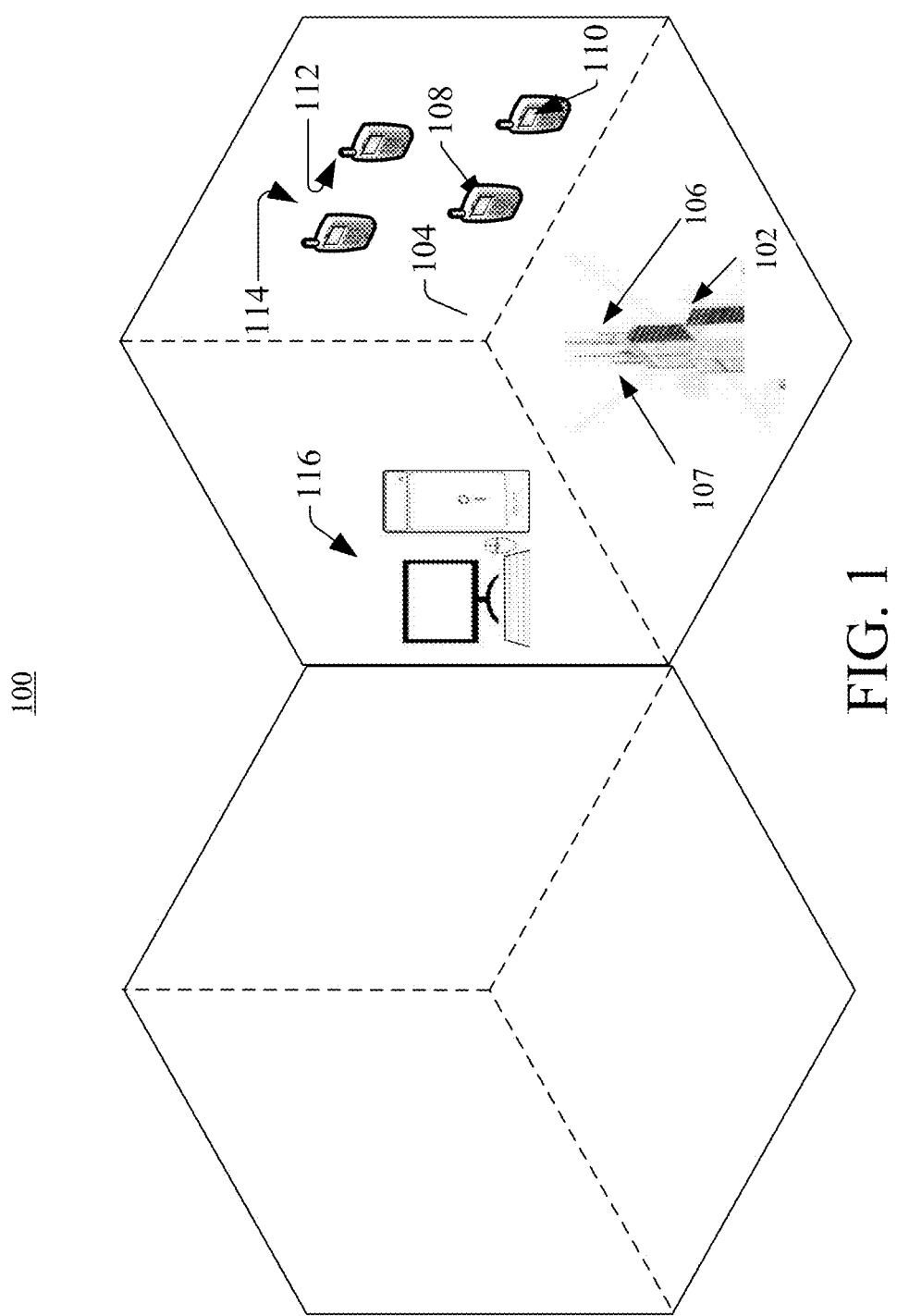
FIG. 1 illustrates an example system that facilitates determination of antenna location.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, the terms "component," "module," "system," "interface," "platform," "service," "framework," "connector," "controller" or the like are generally intended to refer to a computer-related entity, either hardware, a combination of hardware and software, software or software in execution or an entity related to an operational machine with one or more specific functionalities. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include input/output (I/O) components as well as associated processor, application, and/or application programming interface (API) components.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "base station (BS)," "Node B," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

Embodiments described herein can be exploited in substantially any wireless communication technology, including, but not limited to, Wireless Fidelity (Wi-Fi), Global System for Mobile Communications (GSM), Universal Mobile Telecommunications System (UMTS), Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), Zigbee and other 802.XX wireless technologies and/or legacy telecommunication technologies. Further, the term "femto" and "femtocell" are used interchangeably, and the terms "macro" and "macrocell" are used interchangeably.

Various embodiments described herein relate to efficient use of assisted global positioning system (AGPS) information retrieval yield, and determination of antenna locations using AGPS information. One or more of the embodiments can identify particular mobile terminals, and/or subscribers associated with such mobile terminals, to target for retrieval of AGPS information. Further, the AGPS information can be employed to estimate antenna locations within a wireless communication network.

One or more of the embodiments can improve upon previous approaches of manually recording antenna locations by employing aggregated measurements from AGPS information retrieved from mobile terminals within a coverage area of a particular wireless network. In particular, measurement information can be retrieved from the IuB interfaces of a set of mobile terminals and aggregated over time. Statistical approaches can be employed to identify the geographic locations of one or more antennas contributing to the set of mobile terminals.

One or more of the embodiments can provide automatic methods to facilitate validation or invalidation of antenna location information input into databases parameters. Such embodiments can lead to specific investigations of the entries and/or corrections of those values, instrumentation or methods.

One or more embodiments can improve database accuracy, which can improve locating systems, internal and/or external, that rely on antenna location information. One or more embodiments can also benefit network modeling tools that rely on accurate antenna placement to accurately model signal coverage. One or more embodiments can improve different types of Location-Based Services (LBS) (e.g., services that aide parents in locating children via handset location).

FIG. 1 illustrates an example system that facilitates determination of antenna location. System 100 can include a cell 104 associated with co-located antennas 106, 107 co-located antennas 106, 107, mobile devices 108, 110, 112, 114 and/or an antenna location determination system 116. In some embodiments, the co-located antennas 106, 107 can be associated with a BS (not shown) and/or can be positioned on a building (e.g., building 102) within the cell 104. In one or more embodiments, the co-located antennas 106, 107, mobile devices 108, 110, 112, 114 and/or an antenna location determination system 116 can be electrically and/or communicatively coupled to one another to perform one or more functions of system 100.

The co-located antennas 106, 107 can transmit and/or receive information to and/or from the antenna location determination system 116 and/or the mobile devices 108, 110, 112, 114.

The mobile devices 108, 110, 112, 114 can be configured with assisted global positioning system (AGPS) capability and can transmit and/or receive AGPS information to or from the antenna location determination system 116 and/or the co-located antennas 106, 107. In various embodiments, the AGPS information can include, but is not limited to, location and timing information for the mobile devices 108, 110, 112, 114. The location and/or timing information can be employed to determine antenna locations for co-located antennas serving the mobile devices 108, 110, 112, 114.

The antenna location determination system 116 can determine an estimated location for the co-located antennas 106, 107. In various embodiments, the antenna location determination system 116 can receive information from and transmit information to the mobile devices 108, 110, 112, 114. For example, in some embodiments, the antenna location determination system 116 can receive AGPS information from one or more of the mobile devices 108, 110, 112, 114.

Figure 2:
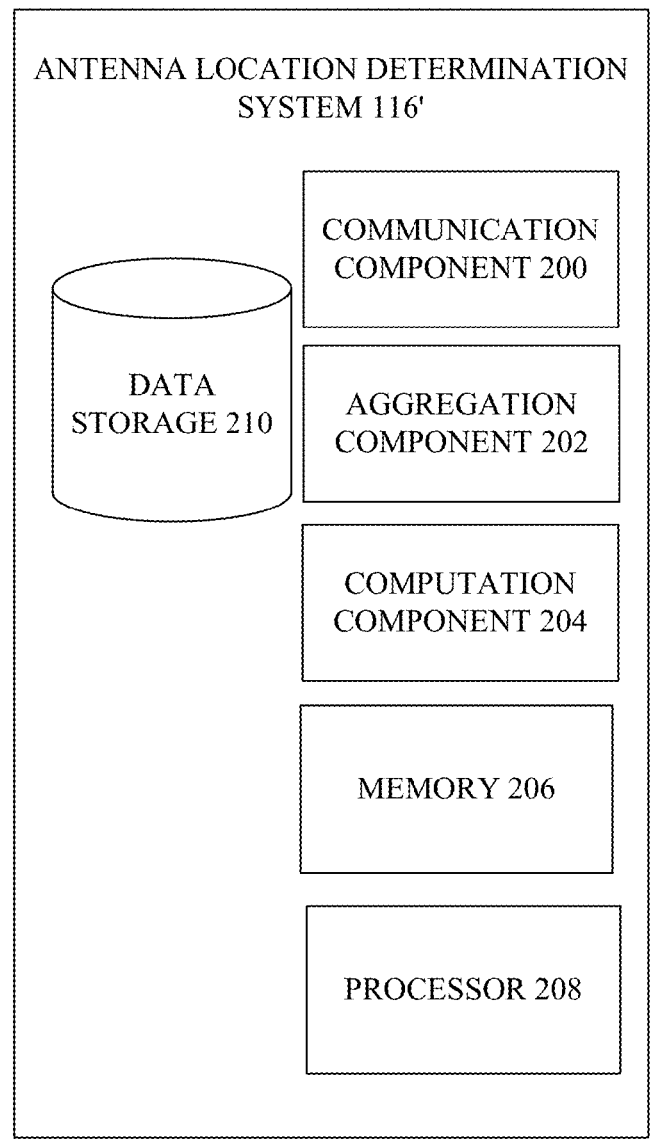
FIG. 2 illustrates an example system that can be employed to facilitate determination of antenna location.

The antenna location determination system 116 will now be described in more detail with reference to the remaining figures. Turning first to FIG. 2, FIG. 2 illustrates an example antenna location determination system 116' that can be employed to facilitate determination of antenna location. The antenna location determination system 116' can include one or more of the structure and/or functionality of the antenna location determination system 116 described with reference to FIG. 1 (and vice versa).

Turning first to FIG. 2, the antenna location determination system 116' can include a communication component 200, an aggregation component 202, a computation component 204, a memory 206, a processor 208 and/or data storage 210. In one or more embodiments, the communication component 200, aggregation component 202, computation component 204, memory 206, processor 208 and/or data storage 210 can be electrically and/or communicatively coupled to one another to perform one or more of the functions of the antenna location determination system 116'.

The communication component 200 can transmit information to and/or receive information from one or more mobile devices and/or the co-located antennas. The information can be measurement information (e.g., AGPS information), information regarding an estimated antenna location, data, voice, video and/or a combination of one or more of the above types of information.

In some embodiments, the communication component 200 can select particular mobile devices from which to solicit information (e.g., AGPS information). The mobile devices selected by the communication component 200 can be associated with the same co-located antennas in various embodiments.

In various embodiments, the communication component 200 can communicate with selected pairs of the mobile devices to obtain information for antenna location. By way of example, but not limitation, with reference to FIG. 1, mobile devices 108, 110 can be selected as a first pair of mobile devices from which AGPS information is to be received, and mobile devices 112, 114 can be selected as a second pair of mobile devices from which AGPS information is to be received. The information from each pair can be aggregated and employed in the determination of an estimated antenna location.

In various embodiments, the AGPS information can be received by the communication component 200 in response to the communication component 200 transmitting one or more AGPS queries to one or more mobile devices.

In some embodiments, the communication component 200 can determine the one or more mobile devices to query for AGPS information. The selection of mobile devices to solicit for AGPS information can be made based on whether the mobile devices meet a particular criterion.

In some embodiments, the mobile devices selected can be those meeting a fundamental set of criteria. In some embodiments, the fundamental criteria can be association with a particular subscriber, having AGPS capability, currently active and/or having a historical telephone call duration within a predetermined range of time.

Specifically, the one or more mobile devices that have an active call time duration within a particular range of time can be selected. For example, one or more mobile devices having a history of having an active call time duration between approximately 10 and 40 seconds can be selected for solicitation of AGPS information.

In some embodiments, mobile devices having a history of active calls with a duration beyond 10 seconds tend to continue longer than a typical short duration call while active calls having a duration of at least 40 seconds are likely to expire prior to receiving a response from the AGPS request, which can take approximately 20 to 30 seconds from time of request.

In some embodiments, the one or more mobile devices selected by the communication component 200 can be those meeting the fundamental set of criteria, and also reporting a current signal strength of at least a predetermined value. For example, in some embodiments, the one or more mobile devices selected can be those reporting a current signal strength between −90 dBm and −45 dBm.

In some embodiments, the one or more mobile devices selected by the communication component 200 can be those meeting the fundamental set of criteria, and also reporting at least a predetermined number of TM values in the radio resource control (RRC) measurement report. In some embodiments, the mobile devices selected can be those reporting the highest TM value in the RRC measurement report.

In some embodiments, the one or more mobile devices selected by the communication component 200 can be those meeting the fundamental set of criteria, and those currently in a selected area of a network. For example, an area of a network can be selected based, at least, on a historical yield of successful responses to the AGPS request that meets or exceeds a particular value. As such, the one or more mobile devices queried can be those located in the selected area of the network.

In some embodiments, the one or more mobile devices selected by the communication component 200 can be those meeting the fundamental set of criteria, and having an AGPS return success rate of a predetermined value.

In some embodiments, the one or more mobile devices selected by the communication component 200 can be those meeting the fundamental set of criteria, and currently in need of calibration.

In some embodiments, only mobile devices associated with a selected subscriber (e.g., AT&T subscriber), having AGPS capability, on an active call and having a historical call duration within a predetermined time range are selected by the communication component 200. The mobile devices that meet such criteria can be prioritized by the communication component 200 based, at least, on one or more other criteria. For example, the mobile devices can be prioritized for selection based on the area of the network in which the mobile devices are located, a number of TMs for the mobile devices, the AGPS return success rate and/or the current signal strengths of the mobile devices.

Turning back to the antenna location determination system 116' of FIG. 2, the data storage 210 can be configured to store information transmitted to, received by and/or processed by the antenna location determination system 116'. In various embodiments, the data storage 210 can store information identifying mobile devices selected for query by the communication component 200, TCELL information, AGPS information, information test antenna locations and/or estimated antenna location. In various embodiments, TCELL information can include chip offset information associated with BS radios. The BS can be associated with the mobile devices.

The memory 206 can be a computer-readable storage medium storing computer-executable instructions and/or information for performing the functions described herein with reference to the antenna location determination system 116'. Processor 208 can perform one or more of the functions described herein with reference to the antenna location determination system 116'. In some embodiment, the processor 208 can perform the one or more functions based on computer-executable instructions stored in the memory 206.

The aggregation component 202 can aggregate the measurement information, or portions thereof, received from the mobile devices. In various embodiments, the aggregation component 202 can aggregate the information over a period of hours, days, weeks, months and/or years. As such, in some embodiments, the measurement information employed for the estimation of the antenna locations can be aggregated measurement information.

The computation component 204 can compute one or more estimated antenna locations. In some embodiments, the estimated antenna locations can be the locations of co-located antennas 106, 107 described with reference to FIG. 1. In some embodiments, the estimated antenna locations are computed based on measured AGPS information, and stored TCELL values, for the mobile devices transmitting the AGPS information to the antenna location determination system 116'.

Figure 3:
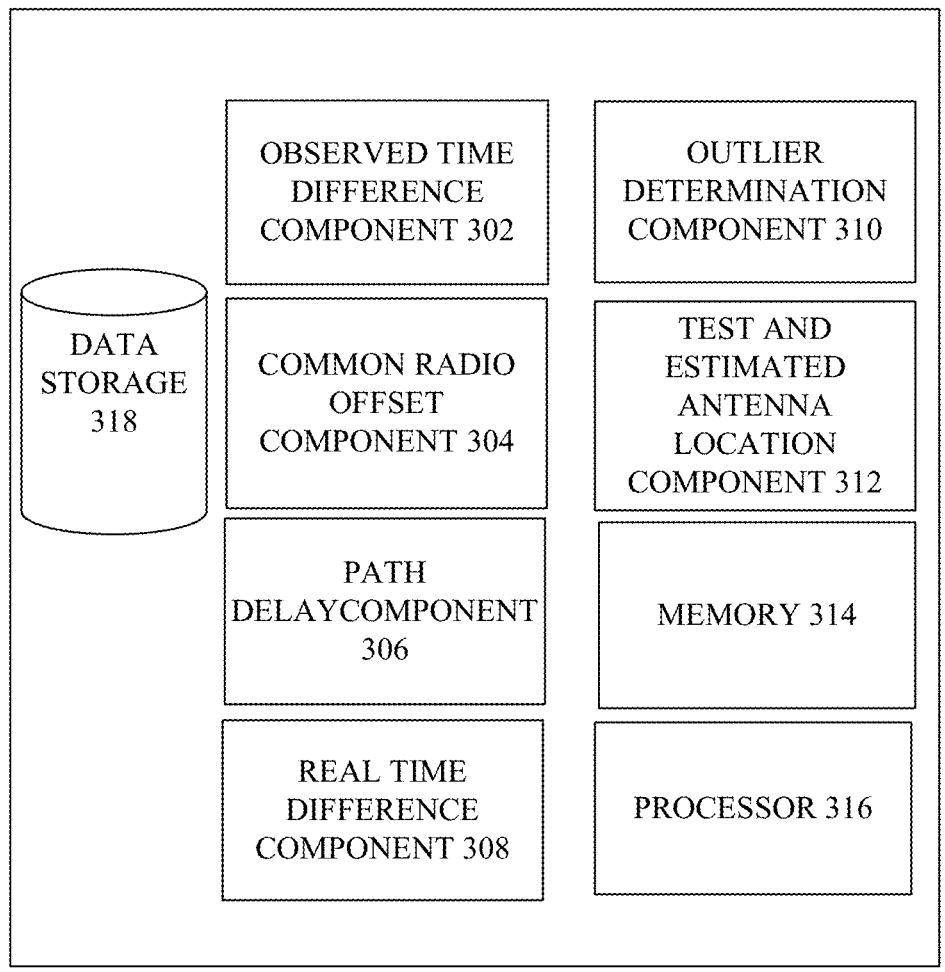
FIG. 3 illustrates another example system that can be employed to facilitate determination of antenna location.
Figure 4:
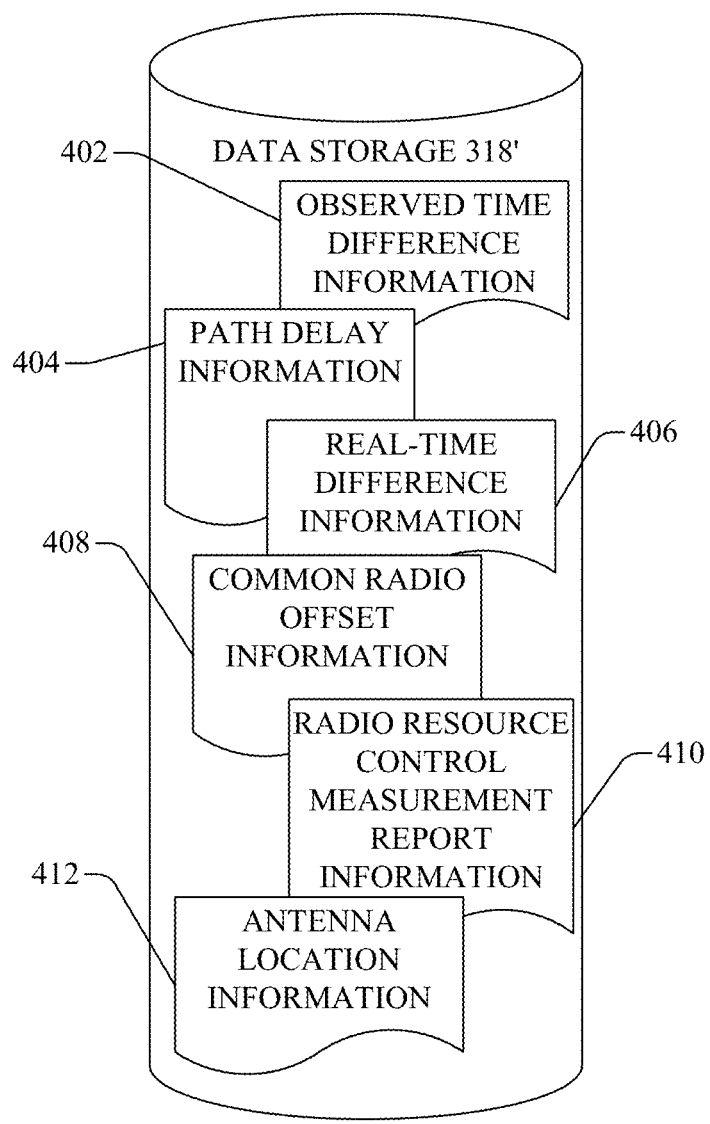
FIG. 4 illustrates an example data storage that facilitates determination of antenna location.

The computation component 204 of the antenna location determination system 116' will now be described in more detail with reference to the remaining figures. Turning first to FIGS. 3 and 4, FIG. 3 illustrates another example system that can be employed to facilitate determination of antenna location. FIG. 4 illustrates an example data storage that facilitates determination of antenna location. The computation component 204' can include one or more of the structure and/or functionality of the computation component 204 described with reference to FIG. 2 (and vice versa).

The computation component 204' can include an observed time difference (OTD) component 302, common radio offset component 304, path delay component 306, real time difference (RTD) component 308, outlier determination component 310, test and estimated antenna location (TEAL) component 312, memory 314, processor 316 and/or data storage 318. In various embodiments, one or more of the OTD component 302, common radio offset component 304, path delay component 306, RTD component 308, outlier determination component 310, TEAL component 312, memory 314, processor 316 and/or data storage 318 can be electrically and/or communicatively coupled to one or another to perform one or more of the functions of computation component 204'.

The OTD component 302 can compute the observed time difference between BS radios (e.g., BS radios i and j). The BS radios can be associated with mobile devices from which AGPS information is received. In various embodiments, the OTD can be derived from the AGPS information received from the mobile devices. For example, the OTD component 302 can accumulate OTD values from RRC measurement reports received from the mobile devices transmitting AGPS information. RRC measurement report information 410 can be stored in data storage 318'. The OTD values can be stored as OTD information 402 in the data storage 318'.

The common radio offset component 304 can compute a chip offset between a pair of BS radios (e.g., BS radios i and j). In various embodiments, a first BS radio (e.g., BS radio i) for a specific sector can have an offset of 0 while a second BS radio (e.g., BS radio j) for the sector can have an offset of 1. In various embodiments, the offset can be the TCELL value for the BS radio for the sector. In this instance, for example, the TCELL values can be 0 and 1, respectively. The chip offset can equal the difference between the offsets, or can be equal to 1. Each chip offset can correspond to 256 chips. As such, a chip offset of 1 can correspond to 256 chips. However, in various embodiments, the offset can correspond to a different number of chips (e.g., an offset of 1 corresponding to 260 chips). In such instances, the difference of 4 chips can imply antenna location that has not been properly determined and/or accounted for. The antenna location determination system 116 can employ the offset information to increase the likelihood of estimating the actual antenna location. The chip offset can be or be included as the common radio offset information 408 stored in the data storage 318'.

In various embodiments, if the BS radios are associated with cell sectors having known and significant radio frequency (RF) cable delay differences between the BS radios and the cell antenna input ports, an offset table can be predetermined for the cell sector. In other embodiments, the cable delays between the BS radios and the cell sector antenna inputs can be assumed to be equal for all BS radios in a cell sector.

The path delay component 306 can compute the path delay between signals received from a pair of mobile devices from which the AGPS information is received. The path delay can be or be included within the path delay information 404 stored in the data storage 318'.

The RTD component 308 can compute the transmission time offset between two BS s associated with the co-located antennas. The transmission time offset can be included in the real-time difference information 406 stored in data storage 318'.

The TEAL component 312 can compute test antenna locations and determine estimated antenna locations. In some embodiments, the estimated antenna locations can be determined based on the computed test antenna locations, chip offset values and/or the OTD values.

With reference to FIGS. 2 and 3, in some embodiments, the TEAL component 312 can receive and/or process information associated with a first set of mobile devices selected by the communication component 200 to provide AGPS information. For example, the TEAL component 312 can receive the OTD values received from the mobile devices. The OTD values can be processed by the OTD component 302 and output to the TEAL component 312. The TEAL component 312 can also process the chip offset information (e.g., TCELL values).

In some embodiments, the TEAL component 312 for a pair of mobile devices 108, 110 can employ Equation (1) in computing the estimated antenna location. For example, Equation 1 can be:

$$OTD_{ij} - (TCELL\ value_j - TCELL\ value_i) = D_{ij} = D_i - D_j \quad (1)$$

where $OTD_{ij}$ can be the OTD between BS radio i and BS radio j, $TCELL\ value_j$ can be the TCELL value (or chip offset) associated with BS radio j, $TCELL\ value_i$ can be the TCELL value (or chip offset) associated with BS radio i, $D_i$ can be the distance from the mobile device i to antenna i, $D_j$ can be the distance from the mobile device j to antenna j and $D_{ij}$ can be the path delay once the RTD is removed from the $OTD_{ij}$.

The TEAL component 312 can determine a first set of test antenna locations associated with the first set of mobile devices. In some embodiments, the test antenna locations can be stored in the antenna location information 412 in data storage 318'. In some embodiments, for each AGPS received from a mobile device within the first set of mobile devices, the TEAL component 312 assumes a test antenna location. The assumed test location can be assumed based on the AGPS information received from a mobile device.

The TEAL component 312 can compute a first set of distances between the mobile device and the test antenna location. For example, for an assumed test antenna location, the TEAL component 312 can compute a distance from the assumed test location to the mobile device providing the AGPS from which the assumed test location was derived.

The TEAL component 312 can compute a second set of distances from a second test antenna location to the location of mobile devices within a second set of mobile devices.

The TEAL component 312 can determine the test antenna location in the second set of test antenna locations that has the lowest error. In some embodiments, the test antenna location can have an error that is lower than an error associated with another test antenna location in the second set of test antenna locations. The test antenna location in the second set of test antenna locations that has the lowest error (or, in some embodiments, has a lower error) can be the estimated antenna location.

In some embodiments, the TEAL component 312 can determine the estimated BS antenna location and/or the relative distances between BS antenna locations periodically. For example, the determination can be made weekly in some embodiments.

While the description discloses a first set of mobile devices, in some embodiments, the first set of mobile devices can include only a single mobile device, while in other embodiments, the first set of mobile devices can include any number of mobile devices selected by the communication component 200 for submission of AGPS information to the antenna location determination system 116'. Also, in various embodiments, the number of mobile devices in the first set of mobile devices can change as different mobile devices can be aggregated and/or removed based on whether the mobile devices meet the criteria for selection, whether antenna location estimates need to be updated or the like.

The outlier determination component 310 can determine and/or filter out outlier values computed in the process of determining the estimated antenna locations. In some embodiments, the outlier values can be those influenced by repeater delay. For example, since a repeater in the network receives a radio signal from a mobile device and re-broadcasts that signal, increased signal time delay can result as the signal is captured, processed, and re-transmitted. This signal time delay can cause a signal received at the antenna location determination system to appear to be a signal transmitted from a distance greater than the actual distance from which the signal was transmitted.

To determine signals having delay resultant from the presence of signals, the outlier determination component 310 can employ time delay mapping across the coverage area of the co-located antennas. Those signals that are received with delay that is greater than an expected value can be identified as outliers and the signals and/or the possible antenna location calculated based on the signal, can be filtered. For example, in various embodiments, the outlier determination component can employ interquartile filtering to identify outlier values and can filter out such values. Interquartile filtering can employ an interquartile range, which is a measure of statistical dispersion across a group of data points (e.g., possible antenna locations). The interquartile range can be the difference between the upper and lower quartiles of data points.

In some embodiments, the outlier determination component 310 can remove one or more test antenna locations that are outliers prior to computation of the first set of distances by the TEAL component 312. In some embodiments, the outlier determination component 310 can remove one or more of the second set of distances that are outliers prior to computation of the second set of distances by the TEAL component 312.

In some embodiments, the outlier determination component 310 can also identify when signals are received with significant time delays from the time that the AGPS request is made. In various embodiments, these signals can also be filtered out and/or the mobile device from which the signals were received can be identified so that subsequent AGPS requests are not transmitted to the mobile device.

The memory 314 can be a computer-readable storage medium storing computer-executable instructions and/or information for performing the functions described herein with reference to the antenna location determination system 116'. Processor 316 can perform one or more of the functions described herein with reference to the antenna location determination system 116'.

The data storage 318 can be configured to store information transmitted to, received by and/or processed by the computation component 204'. In various embodiments, the data storage 318 can store information identifying mobile devices selected for query by the communication component 200, OTD values, RTD values, common radio offset information, test antenna locations, estimated antenna locations, path delay information, and the like. In some embodiments, the data storage 318 can include the information described with reference to data storage 318' of FIG. 4.

FIGS. 5-9 illustrate example flowcharts of methods that facilitate determination of antenna location.

Figure 5:
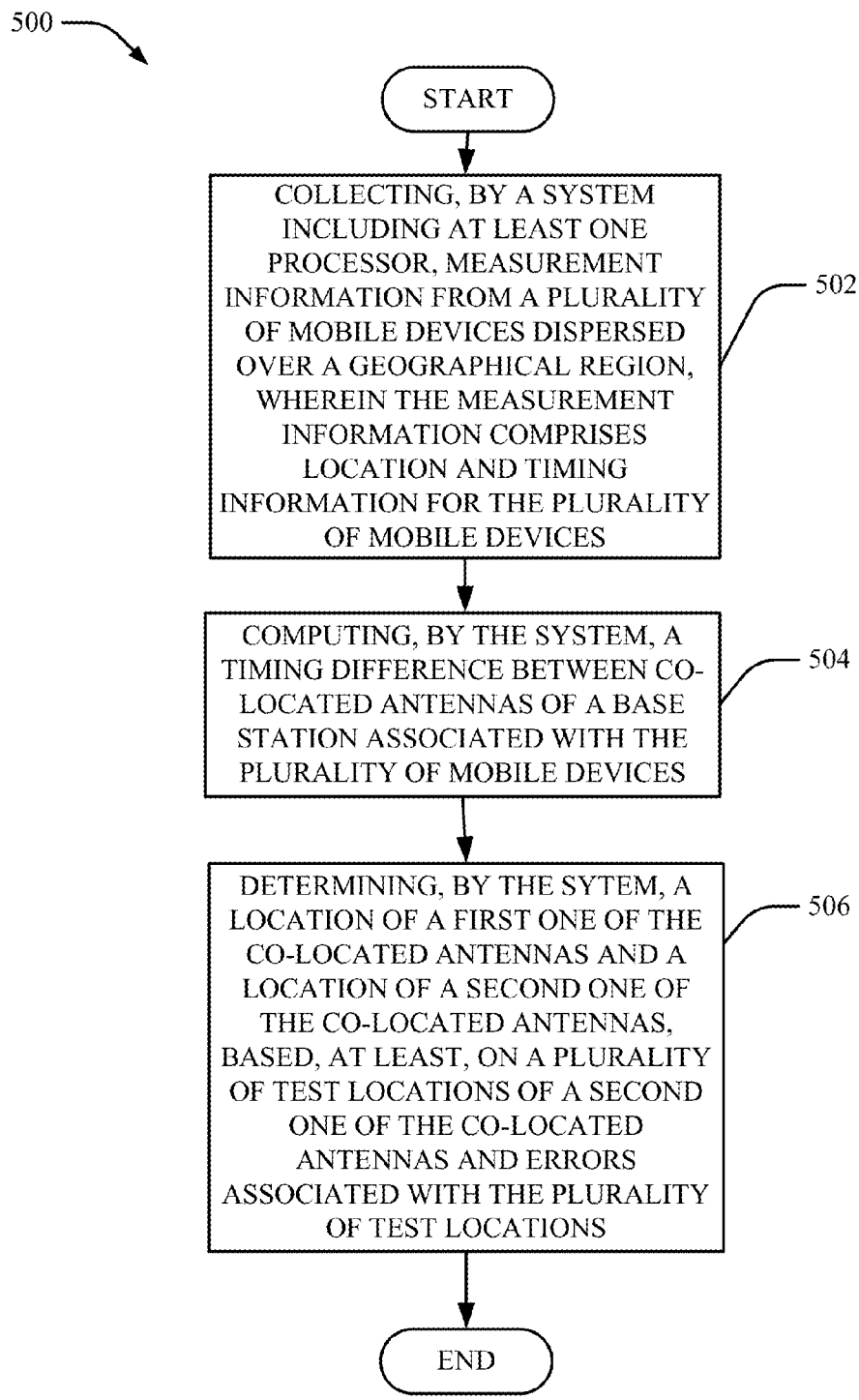
FIGS. 5-9 illustrate example flowcharts of methods that facilitate determination of antenna location.

Turning first to FIG. 5, at 502, method 500 can include collecting, by a system including at least one processor, measurement information from a plurality of mobile devices dispersed over a geographical region. In some embodiments, the measurement information can include location and timing information for the plurality of mobile devices. The system can be the antenna location determination system 116, 116' in some embodiments.

At 504, method 500 can include computing, by the system, a timing difference between co-located antennas of a BS associated with the plurality of mobile devices.

At 506, method 500 can include determining, by the system, a location of a first one of the co-located antennas and a location of a second one of the co-located antennas. In some embodiments, the determination can be based, at least, on a plurality of test locations of the second one of the co-located antennas and errors associated with the plurality of test locations.

In some embodiments, determining the location of the first one of the co-located antennas and the location of the second one of the co-located antennas can include evaluating a plurality of areas circumscribing the plurality of test locations. Then, a plurality of first distances between a plurality of mobile devices and respective plurality of test locations can be assigned.

A plurality of second distances between the plurality of mobile devices and estimated locations of the second one of the co-located antennas can be determined. The estimated locations of the second one of the co-located antennas can be based on the plurality of first distances.

A plurality of errors between the plurality of second distances and the plurality of test locations can be determined. The errors can be root mean square errors in some embodiments.

One of the plurality of second distances corresponding to the least error can be determined. The location of the second one of the co-located antennas can also be determined to be the one of the plurality of second distances corresponding to the least one of the plurality of errors. Further, the location of the first one of the co-located antennas can be determined to be the one of the plurality of test locations employed to compute the one of the plurality of second distances corresponding to the least one of the plurality of errors.

Figure 6:
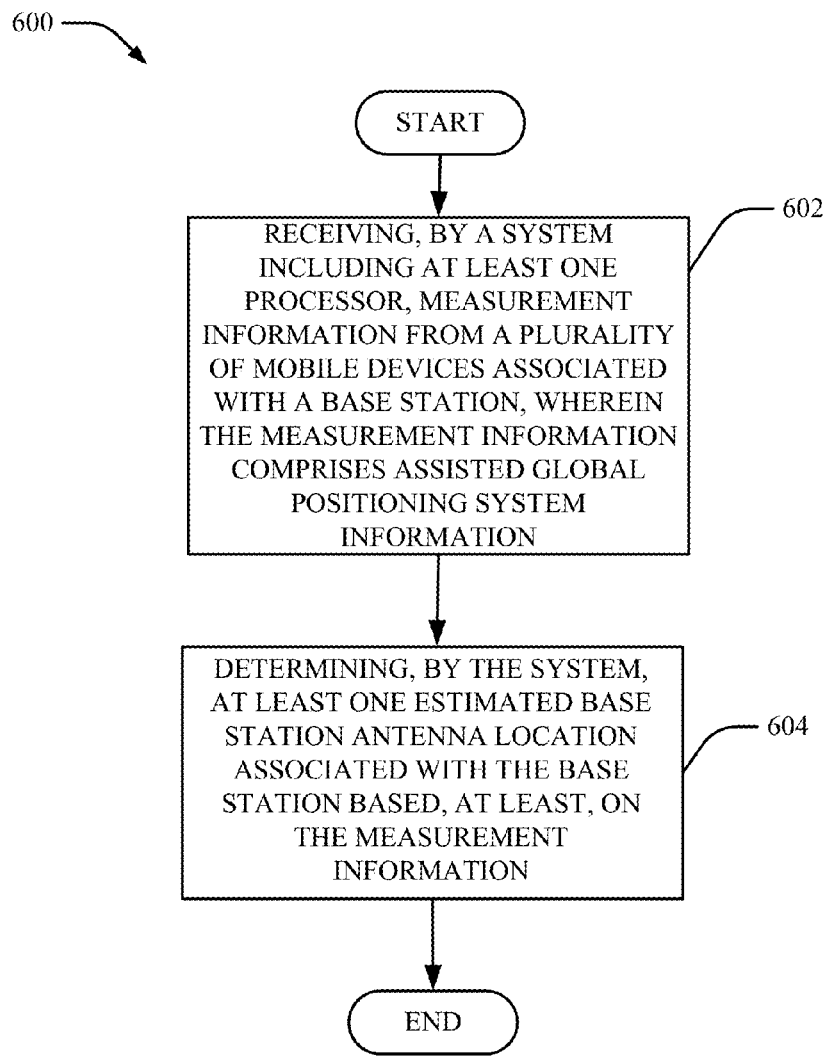

Turning now to FIG. 6, at 602, method 600 can include receiving measurement information from a plurality of mobile devices associated with co-located antennas. In various embodiments, the measurement information can be aggregated from the mobile devices over a period of hours, days, weeks, months and/or years.

In some embodiments, the measurement information can include AGPS information. In some embodiments, the AGPS information can be received from mobile devices selected according to various criteria. By way of example, but not limitation, in some embodiments, an AGPS query can be sent to mobile devices that are associated with a particular subscriber and that have AGPS capability. In some embodiments, the AGPS query can be sent to mobile devices that are also currently involved in an active call and that have a historical call duration time within a particular time range (e.g., between approximately 10 and 40 seconds).

At 604, method 600 can include determining at least one estimated BS antenna location. The estimated BS antenna location can be based on the measurement information. In one embodiment, the determination of the estimated BS antenna location can be as described with reference to FIG. 7.

Figure 7:
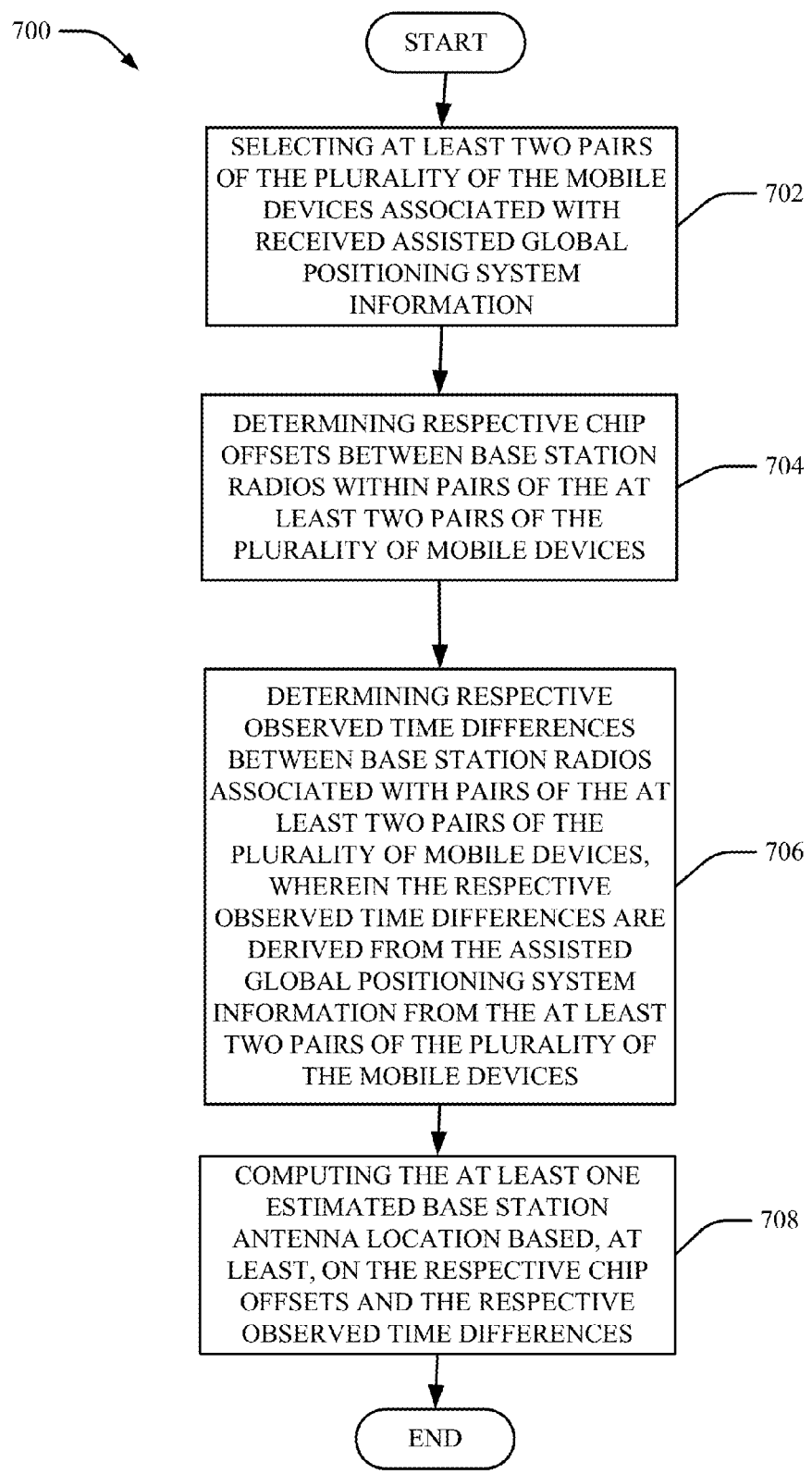

Turning now to FIG. 7, at 702, method 700 can include selecting at least two pairs of the plurality of the mobile devices associated with received AGPS information. For example, from a number of different mobile devices, mobile devices can be paired with one another. In one embodiment, two mobile devices are associated as a first pair and two other mobile devices are associated as a second pair. In other embodiments, one or more of the mobile devices in the pairs can be the same. For example, a first mobile device can be associated with a second mobile device to create a first pair, and the first mobile device can be associated with a third mobile device to create a second pair.

At 704, method 700 can include determining respective chip offsets between BS radios associated with pairs of the at least two pairs of the plurality of mobile devices. In some embodiments, the chip offsets between the BS radios can be the difference between the TCELL value associated with a first BS radio (e.g., BS radio i) and the TCELL value associated with a second BS radio (e.g., BS radio j).

At 706, method 700 can include determining respective OTDs between BS radios associated with at least two pairs of the plurality of mobile devices. The respective OTDs can be derived from the AGPS information from the at least two pairs of the plurality of the mobile devices.

At 708, method 700 can include computing the estimated BS antenna location based, at least, on the respective chip offsets and the respective OTDs. For example, in some embodiments, the estimated BS antenna location, $D_j$, can be determined based on Equation (2) below $$O_{ij} - (TCELL_j - TCELL_i) = D_{ij} = D_i - D_j \qquad (2)$$

in which $OTD_{ij}$ can be the OTD between BS radio i and BS radio j, $TCELL\ value_j$ can be the TCELL value (or chip offset) associated with BS radio j, $TCELL\ value_i$ can be the TCELL value (or chip offset) associated with BS radio i, $D_i$ can be the distance from the mobile device i to antenna i (which can be a test antenna location), $D_j$ can be the distance from the mobile device j to antenna j (which can be the estimated antenna location) and $D_{ij}$ can be the path delay once the RTD is removed from the $OTD_{ij}$.

Figure 8:
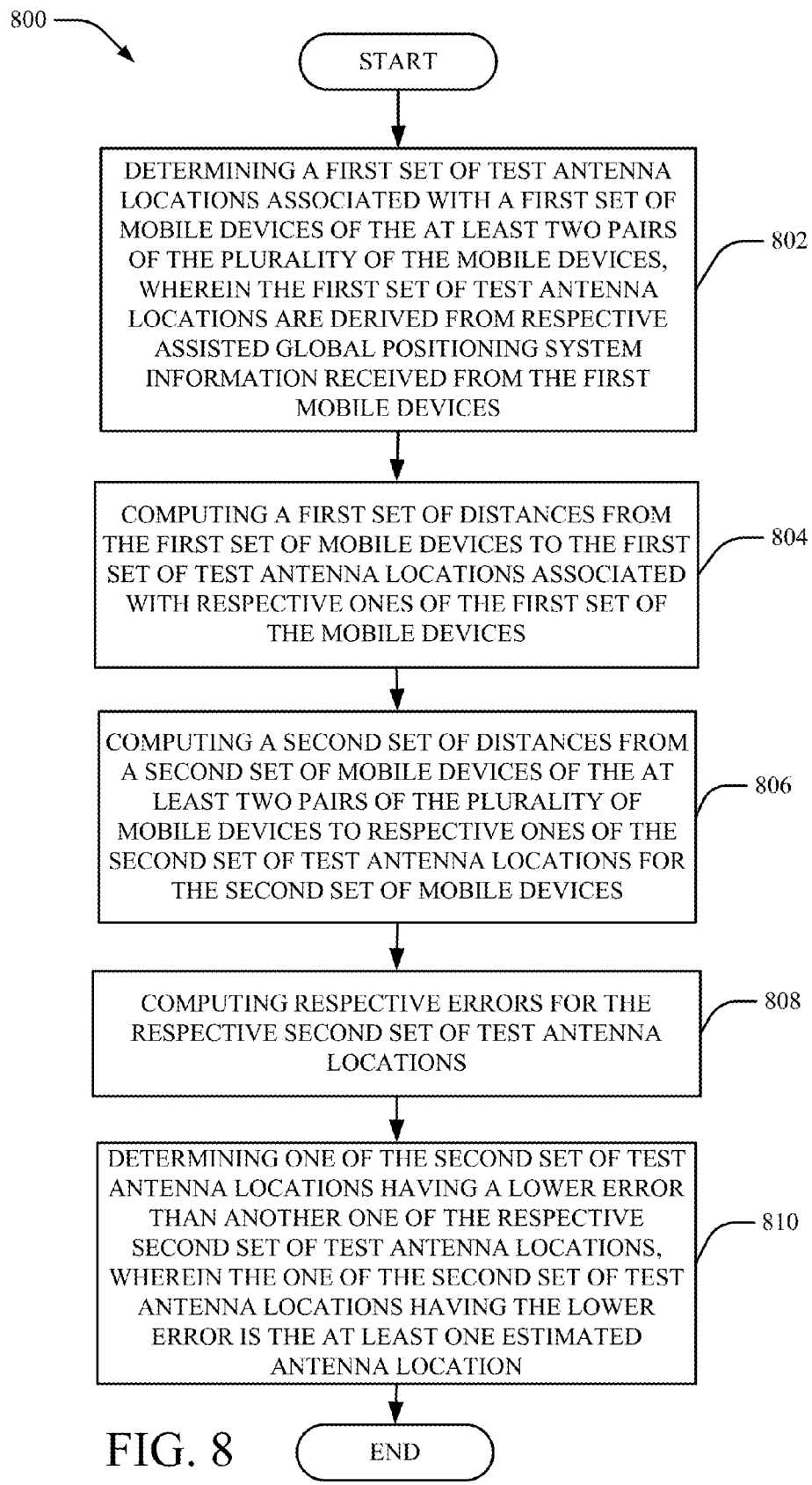

In various embodiments, computing the estimated antenna location can be performed as described with reference to FIG. 8.

At 802, method 800 can include determining a first set of test antenna locations associated with a first set of mobile devices of the at least two pairs of the plurality of the mobile devices. The first set of test antenna locations can be derived from respective AGPS information received from the first set of mobile devices.

At 804, method 800 can include computing a first set of distances from the first set of mobile devices to the first set of test antenna locations associated with respective ones of the first set of the mobile devices.

At 806, method 800 can include computing a second set of distances from a second set of mobile devices of the at least two pairs of the plurality of mobile devices to respective ones of the second set of test antenna locations for the second set of mobile devices.

At 808, method 800 can include computing respective errors for the respective second set of test antenna locations. In various embodiments, the errors can be root mean square errors.

At 810, method 800 can include determining one of the second set of test antenna locations having a lower error than another one of the respective second set of test antenna locations, wherein the one of the second set of test antenna locations having the lower error is the at least one estimated antenna location. In some embodiments, the one of the second set of test antenna locations having the lowest error of the errors for the second set of test antenna locations is the at least one estimated antenna location.

Figure 9:
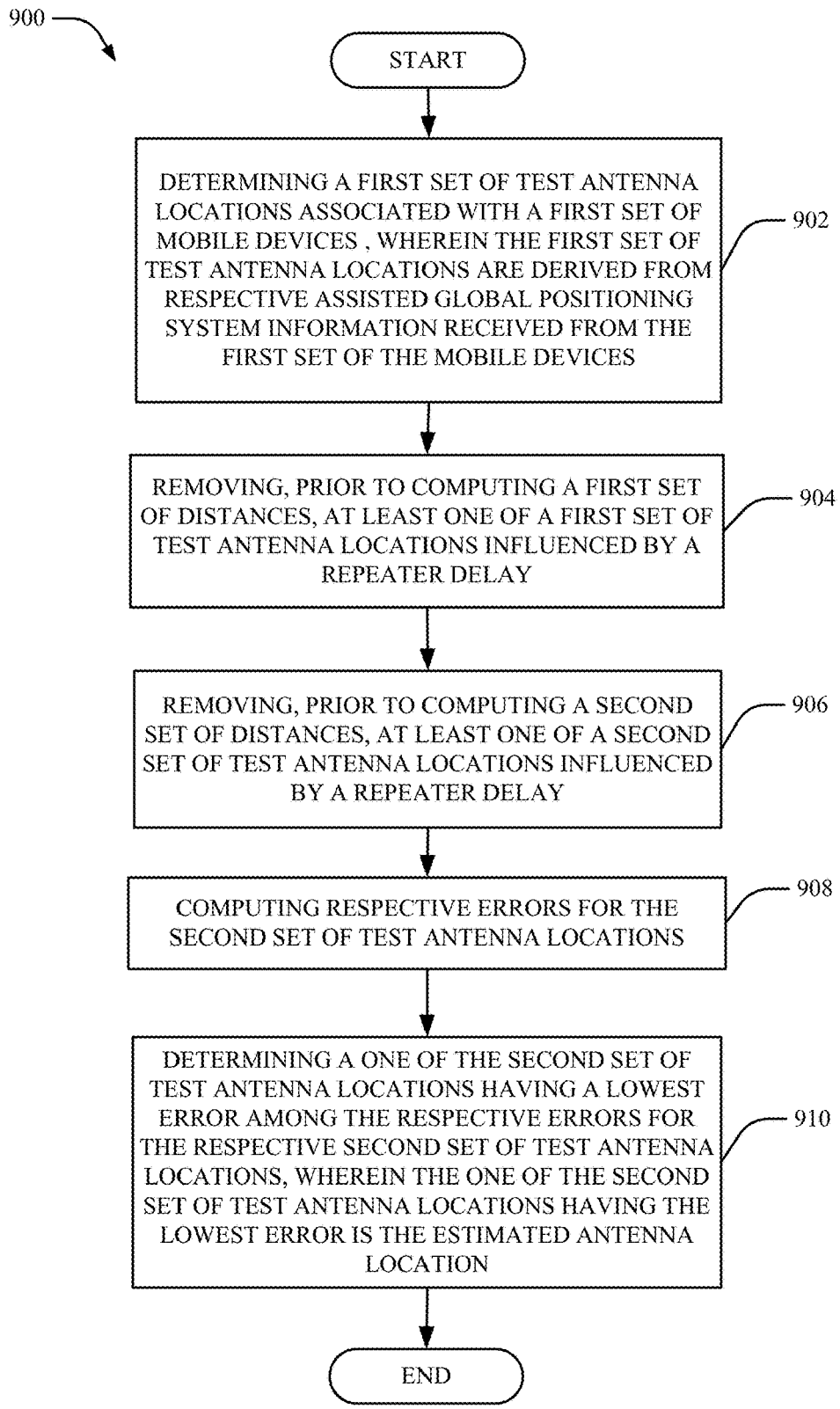

Turning to FIG. 9, at 902, method 900 can include determining a first set of test antenna locations associated with a first set of mobile devices. The first set of test antenna locations can be derived from respective AGPS information received from the first set of the mobile devices.

At 904, method 900 can include removing at least one of the first set of test antenna locations. The test antenna location can be removed based on a determination that the test antenna location that is determined in 902 is influenced by a repeater delay.

At 906, method 900 can include removing at least one of a second set of test antenna locations. The second set of test antenna locations can be derived based on the first test antenna locations and the second set of mobile devices generating AGPS information. The test antenna location can be removed based on a determination that the test antenna location that is determined is influenced by a repeater delay.

At 908, method 900 can include computing respective errors for the second set of test antenna locations. In some embodiments, the errors can be root mean square errors.

At 910, method 900 can include determining a one of the second set of test antenna locations having the lowest error as the estimated antenna location.

In some embodiments, antenna location is estimated in latitude and longitude. Once antenna location is estimated, a subset of the AGPS location information can be employed to estimate the antenna heights. In some embodiments, for example, pairs of antenna heights can be iteratively tested around database-provided values to hone in on the best fit to the dataset.

In some embodiments, the mobile device can be assumed to be limited to be no closer than 10 times the antenna height above ground level. In some embodiments, the great circle or haversine formula can be employed to calculate distance.

In various embodiments, a selected number of RANAP/AGPS values and a selected set of most recently-received RRC_MR information can be stored. Old values can be flushed out in a first in first out fashion in some embodiments. Accordingly, antenna location changes can be determined based on re-computations of antenna locations performed when new RANAP/AGPS values and/or RRC measurement report information is received.

Figure 10:
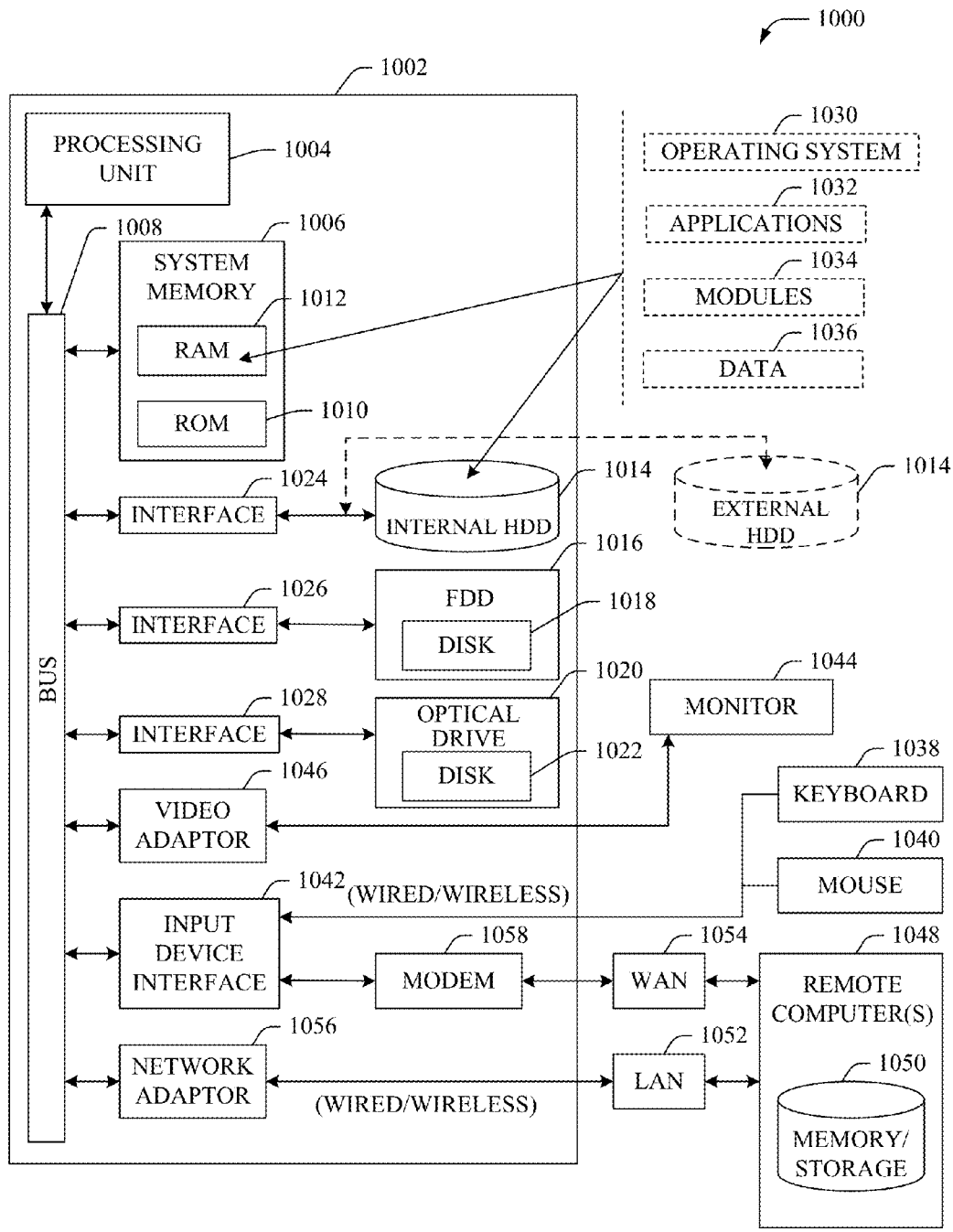
FIG. 10 illustrates a block diagram of a computer operable to facilitate determination of antenna location.

Referring now to FIG. 10, there is illustrated a block diagram of a computer operable to facilitate antenna location determination. For example, in some embodiments, the computer can be or be included within the antenna location determination system 116, 116'.

In order to provide additional context for various embodiments of the embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data.

Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A non-transitory machine-readable storage medium, comprising executable instructions that, when executed by a processor, facilitate performance of operations, comprising:
    determining measurement information from mobile devices, wherein the measurement information comprises assisted global positioning system information;
    determining an estimated location of an antenna of a base station device based on determining respective chip offsets between radios of the base station device associated with pairs of the mobile devices and time differences between the radios of the base station device associated with the pairs of the mobile devices.

2. The non-transitory machine-readable storage medium of claim 1, wherein the determining the estimated location comprises:
    selecting the pairs of the mobile devices.

3. The non-transitory machine-readable storage medium of claim 2, wherein the pairs of the mobile devices are associated with the assisted global positioning system information.

4. The non-transitory machine-readable storage medium of claim 1, wherein the mobile devices are associated with a subscriber identity.

5. The non-transitory machine-readable storage medium of claim 1, wherein the determining the estimated location further comprises:
    determining the estimated location based on the respective chip offsets and the respective observed time differences.

6. The non-transitory machine-readable storage medium of claim 5, wherein the determining the estimated location comprises:
    determining first test antenna locations associated with first mobile devices of the pairs of the mobile devices, wherein the first test antenna locations are determined from respective assisted global positioning system information received from the first mobile devices; and
    determining first distances from the first mobile devices to the first test antenna locations associated with respective ones of the first mobile devices.

7. The non-transitory machine-readable storage medium of claim 6, wherein the determining the estimated location comprises:
    determining second distances from second mobile devices of the pairs of the mobile devices to respective ones of second test antenna locations for the second mobile devices; and
    determining respective errors for the respective ones of the second test antenna locations.

8. The non-transitory machine-readable storage medium of claim 7, wherein the operations further comprise:

determining one of the second test antenna locations comprises a first error lower than a second error of the respective errors for the respective second test antenna locations, and wherein the one of the second test antenna locations is the estimated location.

9. The non-transitory machine-readable storage medium of claim 6, wherein the operations further comprise removing, prior to the determining the first distances, an antenna location of the first test antenna locations determined to be influenced by a repeater delay.

10. The non-transitory machine-readable storage medium of claim 6, wherein the operations further comprise removing, prior to the determining the second distances, an antenna location of the second test antenna locations determined to be influenced by a repeater delay.

11. The non-transitory machine-readable storage medium of claim 1, wherein the determining the estimated location comprises determining the estimated location periodically.

12. An apparatus, comprising:
a processor; and
a memory that stores executable instructions that, when executed by the processor, facilitate performance of operations, comprising:
determining measurement information from mobile devices, wherein the measurement information comprises assisted global positioning system information; and
determining an estimated location of an antenna of a base station device based on determining respective chip offsets between base station device radios associated with pairs of the mobile devices, wherein the determining the estimated location comprises:
determining respective observed time differences between the base station device radios associated with the pairs of the mobile devices, and wherein the determining the respective observed time differences comprises determining the respective observed time differences from the assisted global positioning system information.

13. The apparatus of claim 12, wherein the determining the estimated location comprises:
selecting the pairs of the mobile devices.

14. The apparatus of claim 12, wherein the mobile devices are associated with a subscriber identity.

15. The apparatus of claim 12, wherein the determining the estimated location further comprises:
determining the estimated location based on the respective chip offsets and the respective observed time differences.

16. The apparatus of claim 12, wherein the pairs of the mobile devices are associated with the assisted global positioning system information.

17. A method, comprising:
determining, by a device comprising a processor, measurement information from mobile devices, wherein the measurement information comprises assisted global positioning system information; and
determining, by the device, an estimated base station device antenna location based on determining respective chip offsets between base station device radios associated with at least two pairs of the mobile devices, wherein the determining the estimated base station device antenna location comprises determining respective observed time differences between the base station device radios associated with the at least two pairs of the mobile devices, and wherein the respective observed time differences are determined based on the assisted global positioning system information from the at least two pairs of the mobile devices.

18. The method of claim 17, wherein the determining the estimated base station device antenna location comprises:
selecting the at least two pairs of the mobile devices.

19. The method of claim 18, wherein the at least two pairs of the mobile devices are associated with the assisted global positioning system information.

20. The method of claim 17, wherein the mobile devices are associated with a same subscriber identity.

* * * * *